(12) United States Patent
Periaswamy et al.

(10) Patent No.: US 11,505,924 B2
(45) Date of Patent: Nov. 22, 2022

(54) SYSTEMS AND METHODS FOR SECURING FLUID DISTRIBUTION SYSTEMS

(71) Applicant: YOKOGAWA ELECTRIC CORPORATION, Tokyo (JP)

(72) Inventors: Subramanian Periaswamy, Bayshore Road (SG); Naveen Kashyap, Bellandur Post Bangalore (IN)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/631,115

(22) PCT Filed: Apr. 12, 2018

(86) PCT No.: PCT/JP2018/015414
§ 371 (c)(1),
(2) Date: Jan. 14, 2020

(87) PCT Pub. No.: WO2019/064658
PCT Pub. Date: Apr. 4, 2019

(65) Prior Publication Data
US 2020/0232194 A1    Jul. 23, 2020

(30) Foreign Application Priority Data

Sep. 28, 2017    (IN) .............................. 201741034583

(51) Int. Cl.
*E03B 7/00* (2006.01)
*G01M 3/28* (2006.01)
(Continued)

(52) U.S. Cl.
CPC ............... *E03B 7/003* (2013.01); *G01F 1/32* (2013.01); *G01F 1/58* (2013.01); *G01F 1/84* (2013.01);
(Continued)

(58) Field of Classification Search
CPC ..................................... G01F 1/32; G01F 1/84
See application file for complete search history.

(56) References Cited

U.S. PATENT DOCUMENTS

2014/0173579 A1\* 6/2014 McDonald ................ G06F 8/65
717/170
2016/0076909 A1\* 3/2016 Klicpera ............. G01F 15/0755
73/198
(Continued)

FOREIGN PATENT DOCUMENTS

CN       103532713 A  \*  1/2014
WO       2017/067587 A1    4/2017
WO       2017/092788 A1    6/2017

OTHER PUBLICATIONS

Machine Translation of Zhu (Year: 2014).\*
(Continued)

*Primary Examiner* — Matthew G Marini
(74) *Attorney, Agent, or Firm* — Sheridan Ross P.C.

(57) ABSTRACT

The invention provides secure systems, methods and computer program products for monitoring fluid distribution within a fluid distribution network, and for validating received fluid distribution data, identifying unauthorized losses, and raising alerts in response to detection of unauthorized losses. The invention relies on a plurality of sensors disposed within the fluid distribution network, data received from said sensors, and validation and reconciliation of data based on a distributed ledger system, for detecting instances of unauthorized fluid loss.

15 Claims, 10 Drawing Sheets

(51) Int. Cl.
   *H04L 9/32* (2006.01)
   *G01F 1/32* (2022.01)
   *G01F 1/58* (2006.01)
   *G01F 1/84* (2006.01)
   *H04L 9/08* (2006.01)
   *H04L 9/30* (2006.01)

(52) U.S. Cl.
   CPC ........... *G01M 3/2807* (2013.01); *H04L 9/088* (2013.01); *H04L 9/30* (2013.01); *H04L 9/3239* (2013.01)

(56) References Cited

U.S. PATENT DOCUMENTS

| | | |
|---|---|---|
| 2016/0284033 A1 | 9/2016 | Winand et al. |
| 2017/0163733 A1 | 6/2017 | Grefen et al. |
| 2017/0206522 A1 | 7/2017 | Schiatti et al. |
| 2017/0238072 A1* | 8/2017 | Mackie ................... G01F 1/075 340/870.03 |

OTHER PUBLICATIONS

International Search Report of PCT/JP2018/015414 dated Jul. 17, 2018 [PCT/ISA/210].
Written Opinion of PCT/JP2018/015414 dated Jul. 17, 2018 [PCT/ISA/237].
Official Action with machine translation for Japan Patent Application No. 2020-518101, dated Mar. 8, 2022, 9 pages.

* cited by examiner

[Fig. 1]
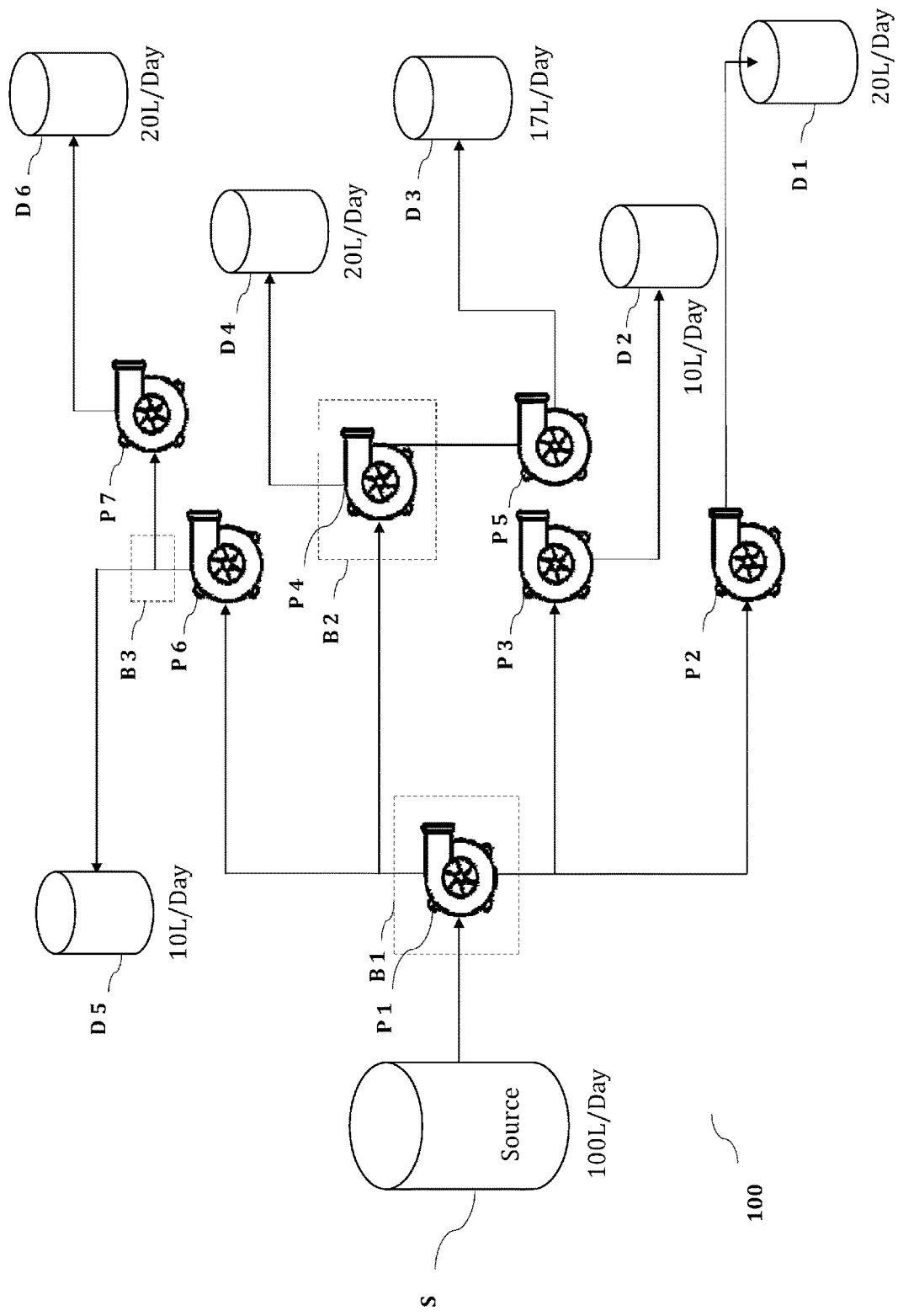

[Fig. 2]
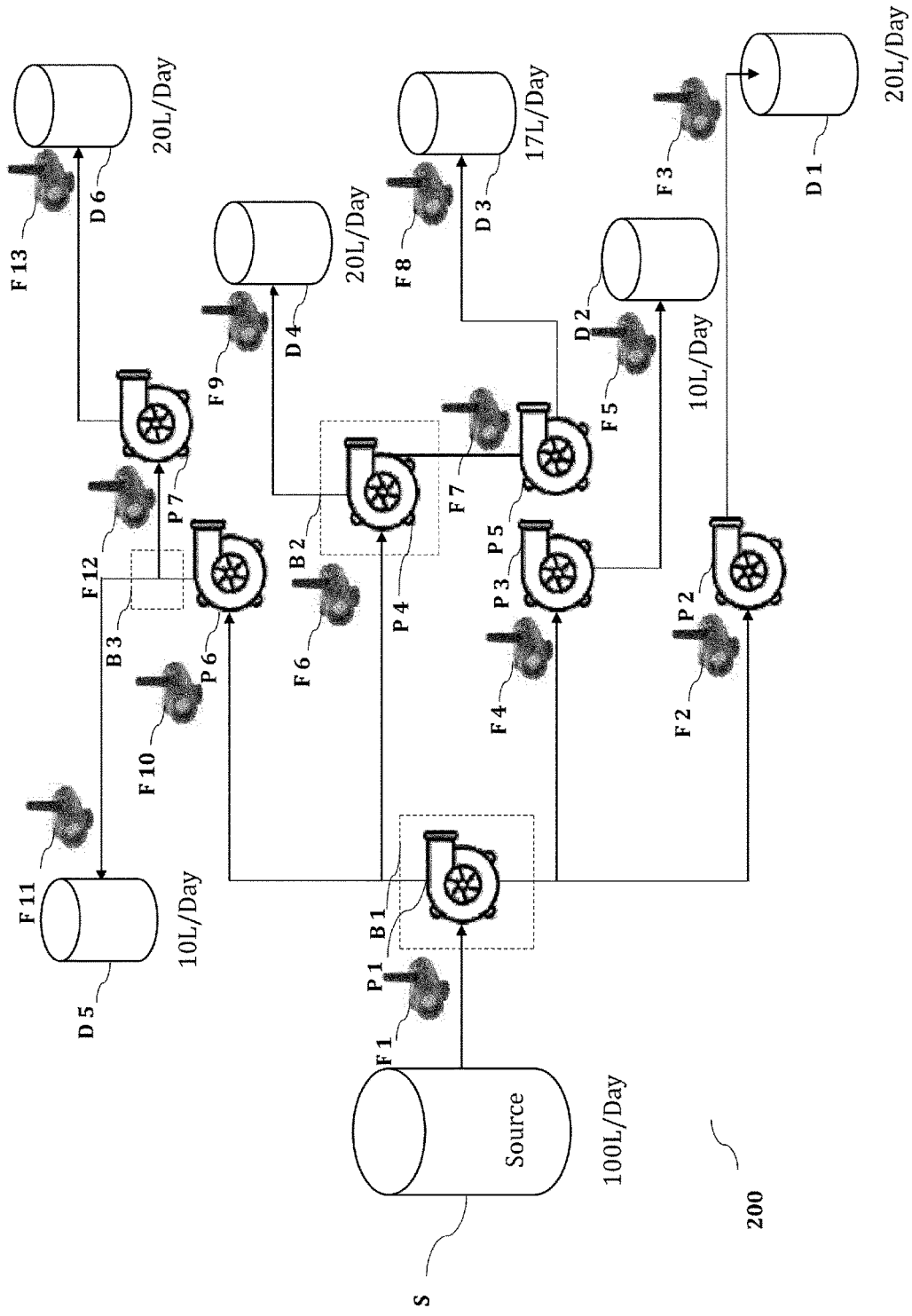

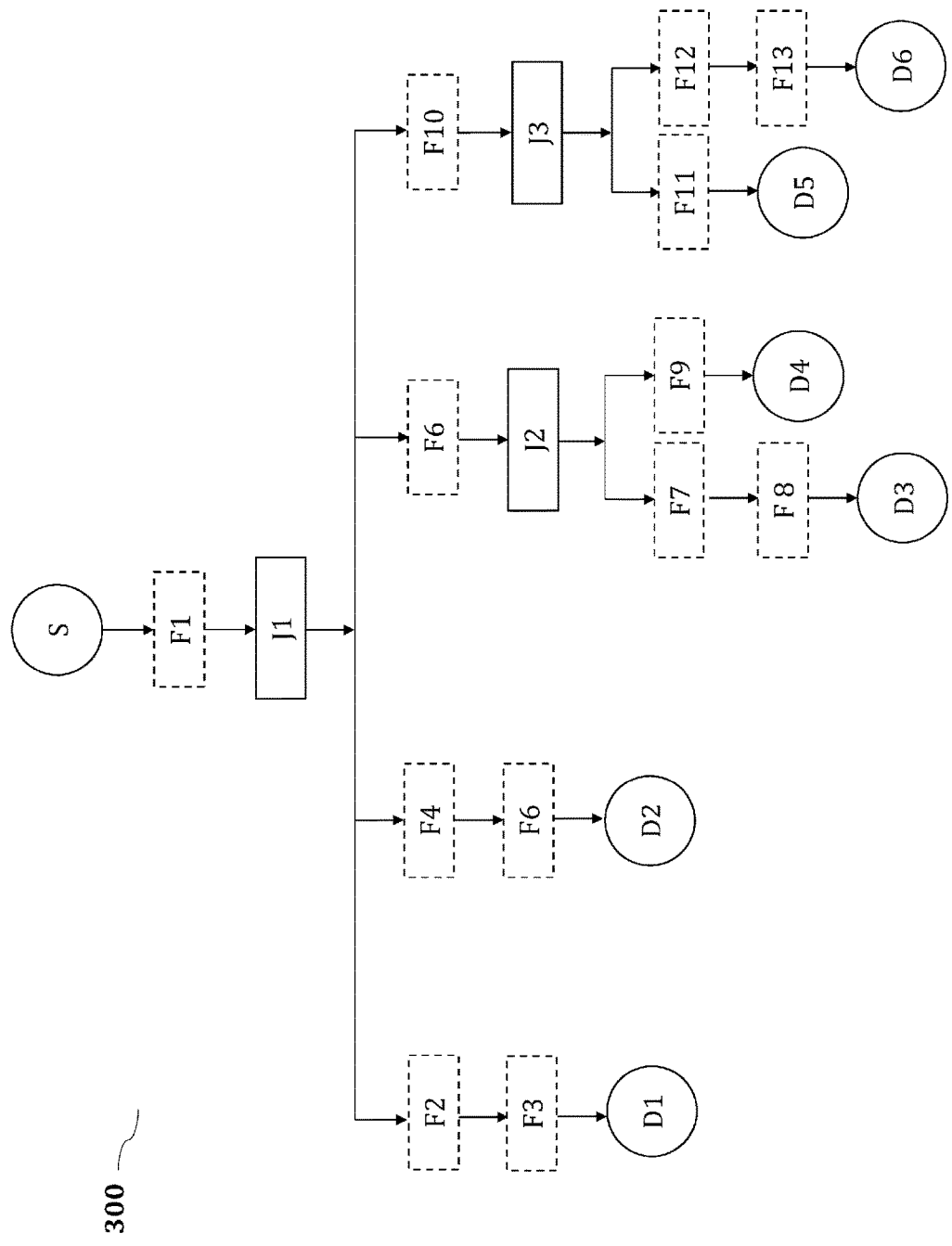
[Fig. 3]

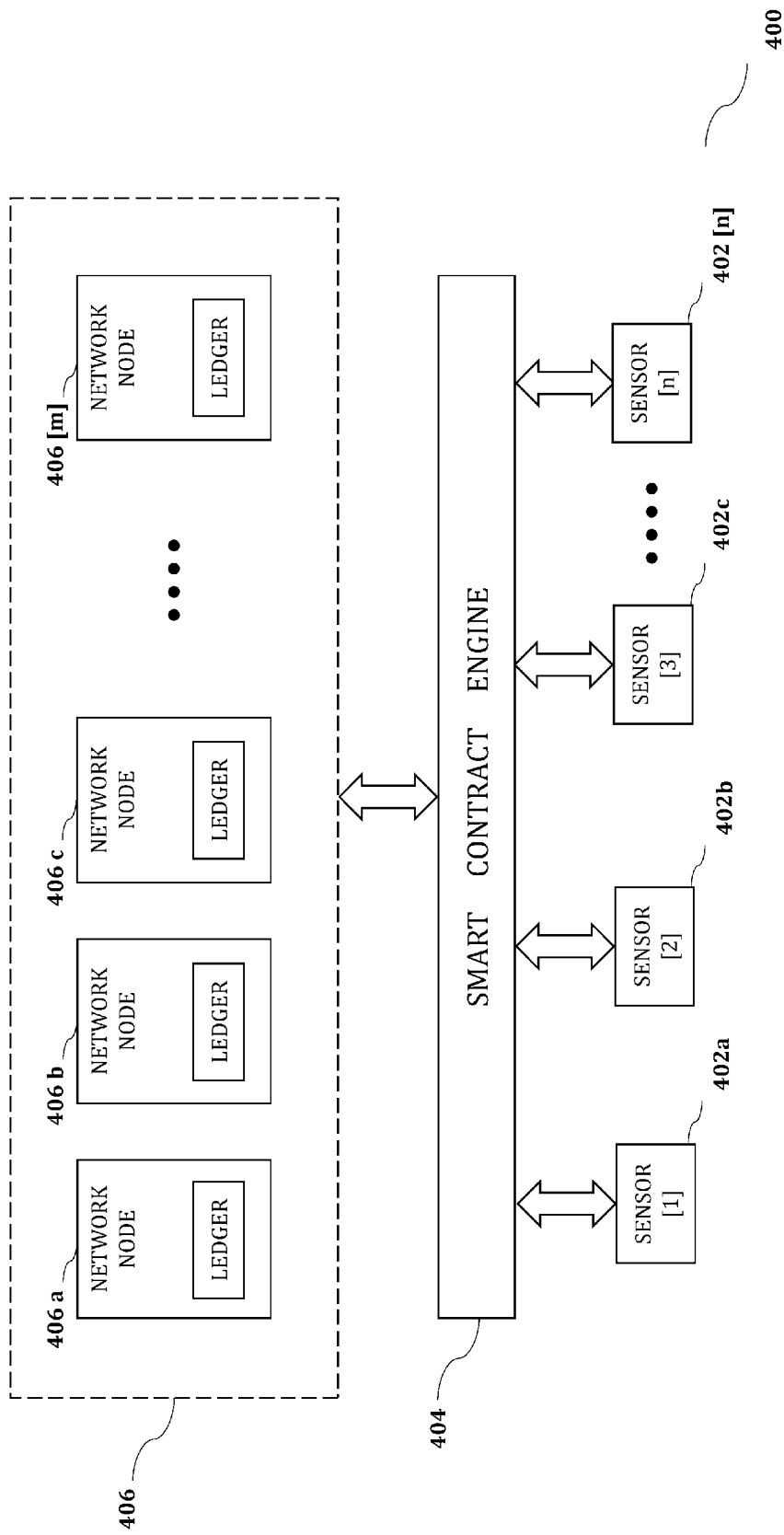

[Fig. 5]
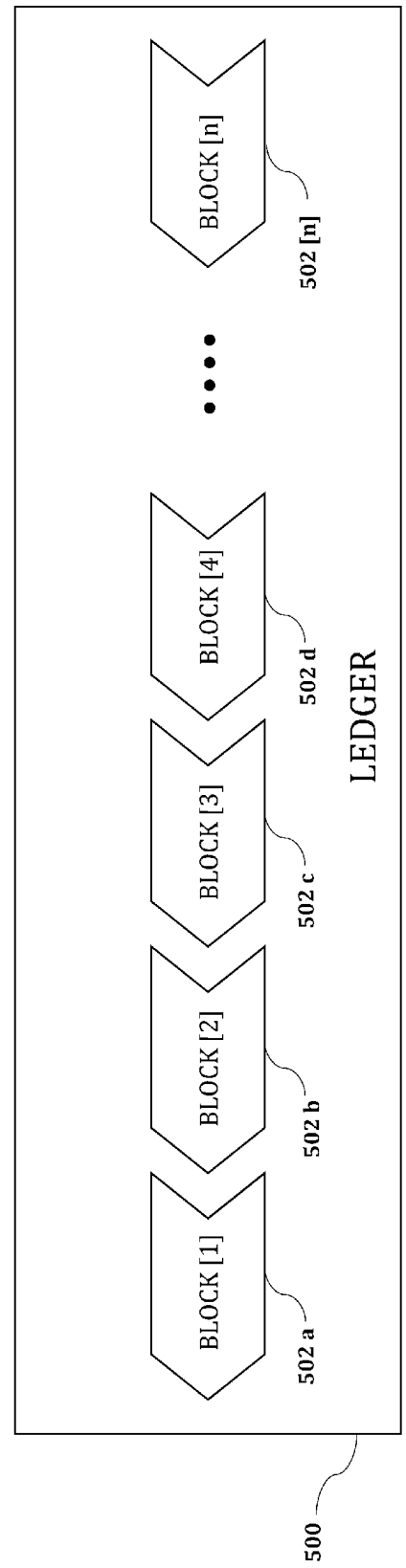

[Fig. 6]

Each block contains:
- A plurality of sensor readings
- A unique sensor ID corresponding to each sensor reading
- A time stamp corresponding to each sensor reading
- A device firmware hash value corresponding to each sensor reading
- A hash corresponding to the immediately proceeding block in the chain BLOCK [i]

600

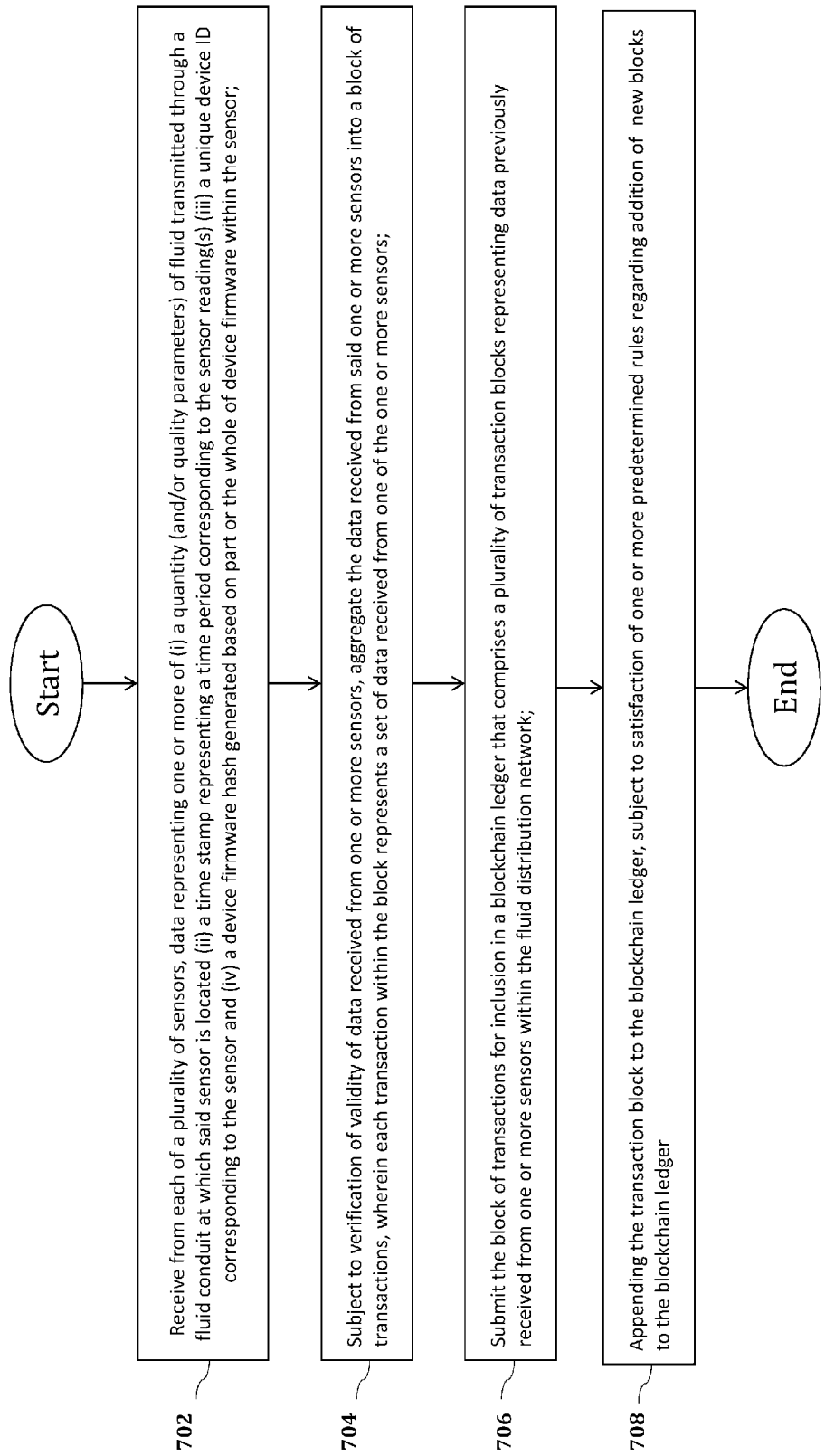
[Fig. 7]

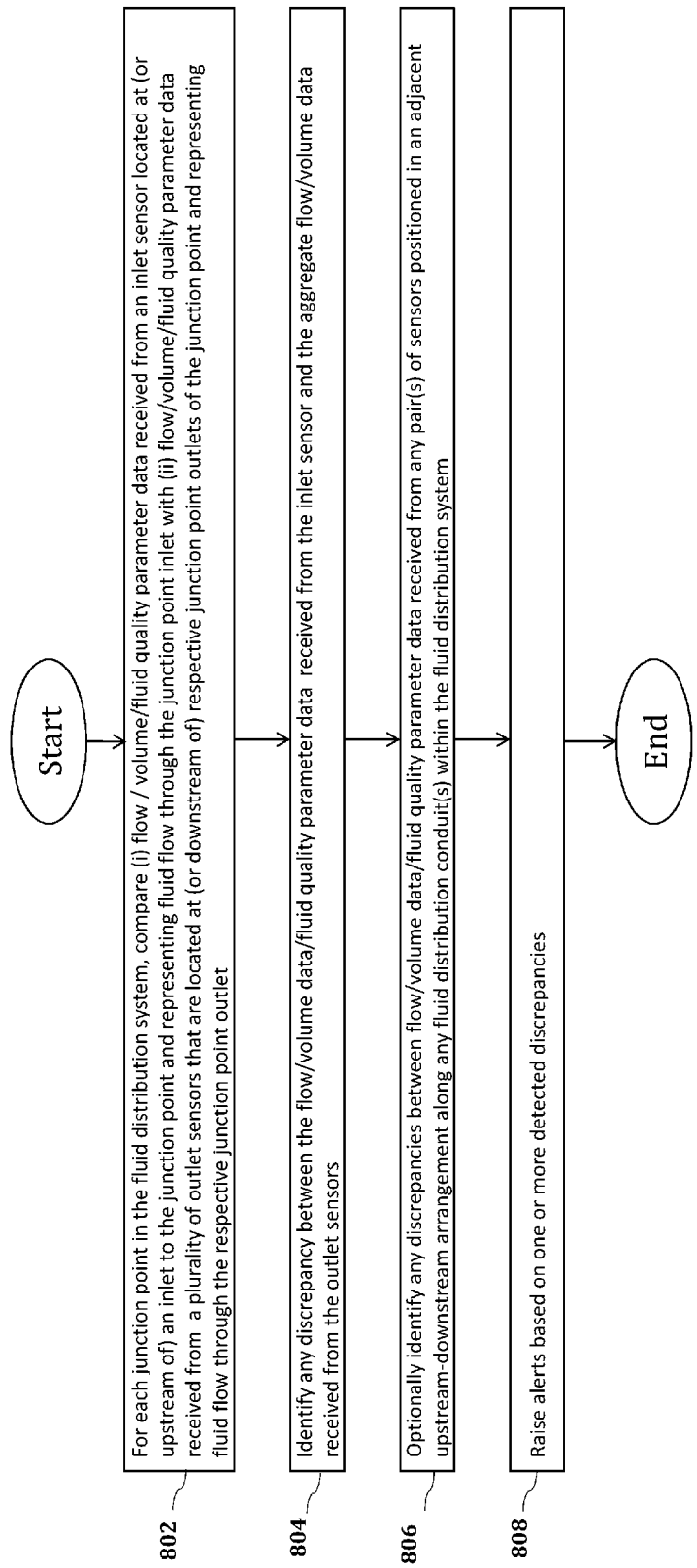
[Fig. 8]

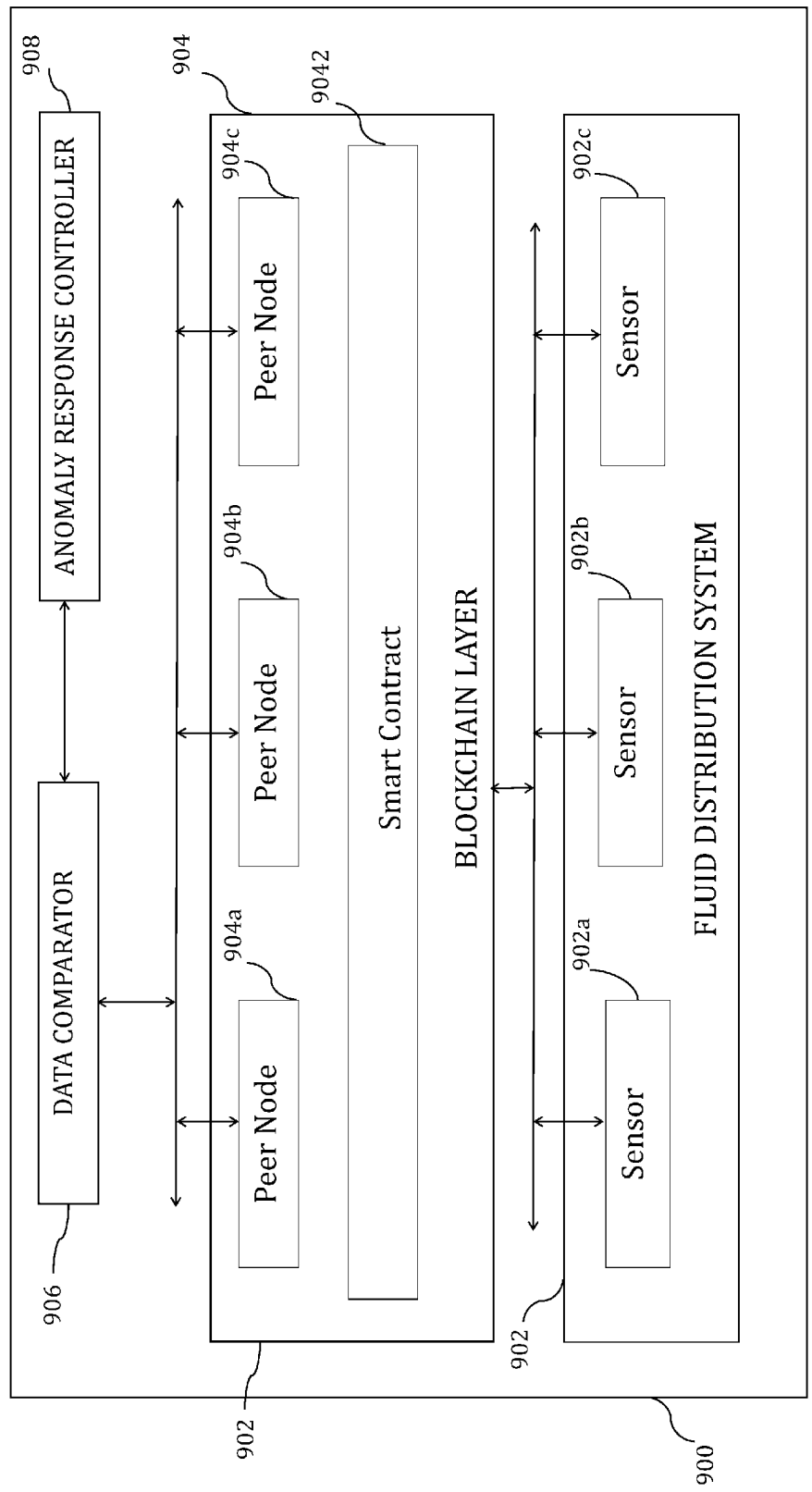
[Fig. 9]

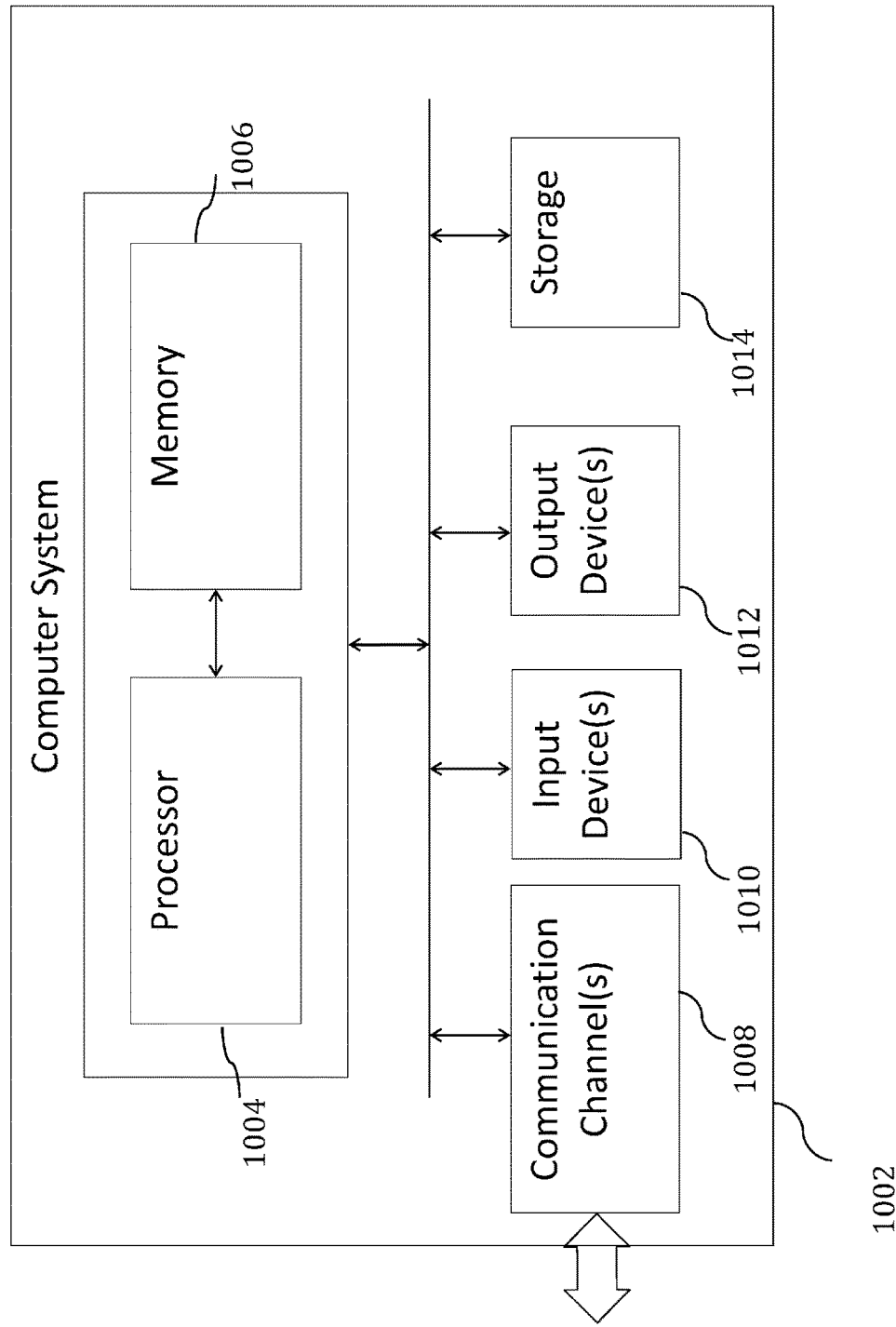
[Fig. 10]

SYSTEMS AND METHODS FOR SECURING FLUID DISTRIBUTION SYSTEMS

TECHNICAL FIELD

The disclosure relates to the field of fluid distribution and fluid distribution systems. In particular, the invention provides secure and tamper-proof technologies for monitoring fluid distribution, for identifying unauthorized losses, and for raising alerts in response to detection of losses.

BACKGROUND ART

Fluid distributions systems are configured to distribute gases or liquids, including without limitation, natural gas, oil, water, or any other fluid that is capable of distribution through an end to end distribution network. Such systems ordinarily comprise a network of fluid distribution conduits, each conduit being configured to deliver a fluid from a first endpoint to a second endpoint (for example, from an inlet to an outlet).

Fluids being delivered through the distribution system may be quantified in terms of flow rate or flow volume. In the event it is found that quantified values of the fluid as measured at an inlet and at an outlet differ significantly, it is reasonable to assume that some of the fluid that entered the inlet did not leave through the outlet—which is indicative of a lossy distribution channel. Lossy channels or conduits may be the result of any number of causes, including but not limited to leakage, blockage, theft, malfunctions or other failures of the fluid distribution system, and may variously be a result of problems with operators, users, meters, pumps, control mechanisms or conduit infrastructure.

To detect fluid loss and subsequently to verify the cause of loss, it is necessary to be able to ensure accurate flow rate measurements or volume measurements in a manner that enables detection of fluid loss or unauthorized fluid removal. The measurement mechanisms additionally need to be secure and tamper proof to ensure that unauthorized persons cannot alter the quantification values received at or received from sensors implemented within the fluid distribution network with a view to conceal losses. Additionally, given the large size of the typical fluid distribution network, and the number of branches and alternate pathways in such systems, there is a need for a system that enables intelligent quantification of losses at various points within the network.

SUMMARY OF INVENTION

The invention provides secure systems, methods and computer program products for monitoring fluid distribution, validating received fluid distribution data, identifying unauthorized losses, and raising alerts in response to detection of unauthorized losses.

The invention provides a system for detecting fluid loss in a fluid distribution network that includes a fluid source, one or more fluid destinations and a network of fluid distribution conduits configured to enable fluid communication between the fluid source and the one or more fluid destinations. The system comprises (i) a plurality of sensors disposed within the fluid distribution network, wherein (a) each of the plurality of sensors is configured to quantify fluid flow, and (b) each of the plurality of sensors is in network communication with a processor implemented smart contract engine, (ii) at least one processor implemented smart contract engine, configured to (c) validate data received from one or more of the plurality of sensors, wherein said validation is based on a set of predefined rules, (d) responsive to validation of data received from a sensor, record the validated data within a transaction block comprising validated data received from one or more other sensors from among the plurality of sensors, and (e) append the transaction block to a blockchain ledger, (iii) a plurality of processor implemented peer nodes, each configured to store and update a copy of the blockchain ledger, and (iv) a data comparator configured to (f) retrieve from the blockchain ledger, a first set of fluid flow data generated by a first sensor and a second set of fluid flow data generated by a second sensor, wherein each of the first and second sensors is selected from among the plurality of sensors, and wherein the first selected sensor is located upstream of the second selected sensor within the fluid distribution network, and (g) identify occurrence of fluid loss within a fluid conduit connecting the first sensor and the second sensor, based on results of a data comparison involving at least the first set of fluid flow data and the second set of fluid flow data.

The data comparator may be configured such that (i) the first selected sensor is located at or upstream of a fluid inlet of a junction point within the fluid distribution network, and (ii) the second selected sensor is located within a branch conduit originating from the junction point.

The data comparator may further be configured such that identification of occurrence of fluid loss is based on receiving and comparing the first set of fluid flow data against an aggregation of fluid flow data received from sensors located within each branch conduit originating from the junction point.

In an embodiment, the data comparator may be configured to detect fluid loss within the fluid distribution network based on analysis of (i) fluid flow data received from sensors positioned at or upstream of each junction point inlet within the fluid distribution network and (ii) fluid flow data received from sensors located within each branch conduit originating from each junction point within the fluid distribution network.

Generation of the first set of fluid flow data and the second set of fluid flow data respectively by said first sensor and said second sensor, may occur within a predefined time window.

In an embodiment, the system may include an anomaly response controller, configured to implement one or more predefined actions in response to detection of fluid loss within the fluid distribution network.

The smart contract engine may be configured to validate fluid flow data received from a sensor, responsive to determining that a device firmware hash value received from such sensor along with the fluid flow data under validation matches a device firmware hash value that (i) has been previously received from such sensor and (ii) has been written to the blockchain ledger.

The invention additionally relates to a method for detecting fluid loss in a fluid distribution network that includes a fluid source, one or more fluid destinations and a network of fluid distribution conduits configured to enable fluid communication between the fluid source and the one or more fluid destinations. The method comprises (i) retrieving from a blockchain ledger, a first set of fluid flow data generated by a first sensor and a second set of fluid flow data generated by a second sensor, wherein each of the first and second sensors is selected from among a plurality of sensors disposed within the fluid distribution network, and wherein the first selected sensor is located upstream of the second selected sensor within the fluid distribution network, (ii) identifying occurrence of fluid loss within a fluid conduit connecting the first sensor and the second sensor, based on results of a data comparison involving at least the first set of fluid flow data and the second set of fluid flow data, wherein the blockchain ledger comprises a distributed ledger database generated based on steps comprising (a) receiving from each of the plurality of sensors disposed within the fluid distribution network, data quantifying fluid flow through a fluid distribution conduit in which said each sensor is located, (b) validating data received from one or more of the plurality of sensors, wherein said validation is based on a set of predefined rules, (c) responsive to validation of received sensor data, recording the validated data within a transaction block comprising validated data received from one or more other sensors from among the plurality of sensors, and appending the transaction block to a blockchain ledger.

In a method embodiment (i) the first selected sensor is located at or upstream of a fluid inlet of a junction point within the fluid distribution network, and (ii) the second selected sensor is located within a branch conduit originating from the junction point.

Identification of an occurrence of fluid loss may in a method embodiment be based on receiving and comparing the first set of fluid flow data against an aggregation of fluid flow data received from sensors located within each branch conduit originating from the junction point.

Further, detecting fluid loss within the fluid distribution network may include analysis of (i) fluid flow data received from sensors positioned at or upstream of each junction point inlet within the fluid distribution network and (ii) fluid flow data received from sensors located within each branch conduit originating from each junction point within the fluid distribution network.

In an embodiment, generation of the first set of fluid flow data and the second set of fluid flow data respectively by said first sensor and said second sensor, occurs within a predefined time window.

The method may further comprise implementing one or more predefined actions in response to detection of fluid loss within the fluid distribution network.

Fluid flow data received from a sensor may be validated in response to a determination that a device firmware hash value received from such sensor along with the fluid flow data under validation matches a device firmware hash value that (i) has been previously received from such sensor and (ii) has been written to the blockchain ledger.

The invention additionally provides a computer program product for detecting fluid loss in a fluid distribution network that includes a fluid source, one or more fluid destinations and a network of fluid distribution conduits configured to enable fluid communication between the fluid source and the one or more fluid destinations, the computer program product comprising a non-transitory computer readable medium having computer readable program code embodied thereon, the computer readable program code comprising instructions for (i) retrieving from a blockchain ledger, a first set of fluid flow data generated by a first sensor and a second set of fluid flow data generated by a second sensor, wherein each of the first and second sensors is selected from among a plurality of sensors disposed within the fluid distribution network, and wherein the first selected sensor is located upstream of the second selected sensor within the fluid distribution network, (ii) identifying occurrence of fluid loss within a fluid conduit connecting the first sensor and the second sensor, based on results of a data comparison involving at least the first set of fluid flow data and the second set of fluid flow data, wherein the blockchain ledger comprises a distributed ledger database generated based on steps comprising (a) receiving from each of the plurality of sensors disposed within the fluid distribution network, data quantifying fluid flow through a fluid distribution conduit in which said each sensor is located (b) validating data received from one or more of the plurality of sensors, wherein said validation is based on a set of predefined rules, (c) responsive to validation of received sensor data, recording the validated data within a transaction block comprising validated data received from one or more other sensors from among the plurality of sensors, and (d) appending the transaction block to a blockchain ledger.

BRIEF DESCRIPTION OF DRAWINGS

FIG. 1 represents a conventional fluid distribution system.

FIG. 2 represents a fluid distribution system in accordance with the present invention.

FIG. 3 is a graph data structure representative of the fluid distribution system of FIG. 2.

FIG. 4 illustrates an embodiment of the present invention that is based on a blockchain ledger implementation.

FIG. 5 illustrates an exemplary structure for a blockchain in accordance with the teachings of the present invention.

FIG. 6 illustrates an exemplary structure for a transaction block within a blockchain in accordance with specific implementations of the present invention.

FIG. 7 illustrates method embodiments of the present invention.

FIG. 8 illustrates method embodiments of the present invention.

FIG. 9 illustrates a system embodiment of the present invention.

FIG. 10 is an exemplary system that may be configured for implementing the present invention.

DESCRIPTION OF EMBODIMENTS

The present invention provides secure systems, methods and computer program products for monitoring fluid distribution, validating received fluid distribution data, identifying unauthorized losses, and raising alerts in response to detection of unauthorized losses.

FIG. 1 illustrates an exemplary fluid distribution system 100 comprising a fluid source S configured to deliver fluid to a plurality of destinations D1 to D6 through a network of fluid conduits as illustrated in the figure. The network includes a plurality of fluid pumps P1 to P7 located at specific locations within the system, to ensure delivery of fluid to the target destinations with a desired pressure head. It would be understood that the presence and location of fluid pumps within the system is optional and subject to several different considerations. Fluid from source S is delivered through the network of fluid conduits to destinations D1 to D6.

In the illustration of FIG. 1, source S outputs 100 liters/day, while destination D1 receives 20 litres/day, destination D2 receives 10 litres/day, destination D3 receives 17 litres/day, destination D4 receives 20 litres/day, destination D5 receives 10 litres/day, and destination D6 receives 20 litres/day. In the example illustrated in FIG. 1, the total amount of fluid received at destinations D1 to D6 is 97 liters/day, which is 3 liters/day less than the amount of fluid being dispersed from source S. The present invention seeks to provide solutions for detecting such losses, and for identifying the fluid loss location(s).

FIG. 2 illustrates an exemplary fluid distribution system 200—comprising the fluid distribution system previously illustrated in FIG. 1, and additionally having sensors F1 to F13 disposed at various locations within said fluid distribution system 200.

Fluid flowing through distribution conduits within a fluid distribution network may be quantified in terms of characteristics such as flow rate or flow volume. Such characteristics may be measured by any number of different measurement devices including flow sensors, volume sensors, displacement sensors, vibration sensors or other type of measuring devices known to those of skill in the domain of fluid distribution system architectures. For the purposes of the present invention, sensors F1 to F13 would be understood as comprising any one or more such measurement devices. Locations at which such sensors may be installed may include any of (i) one or both endpoints of a distribution conduit, (ii) immediately upstream of a junction point (i.e. a point at which a single fluid distribution conduit branches into a plurality of fluid distribution conduits), and (iii) within one or more branch conduits immediately downstream of a junction point. As described in more detail below, the invention contemplates comparison and/or reconciliation of fluid quantification data received from measurement devices located within the fluid distribution network, to detect losses and identify an approximate or exact loss location.

In the exemplary embodiment of FIG. 2,
Flow sensor F1 is positioned between source S and junction point J1
Flow sensor F2 is positioned between junction point J1 and pump P2
Flow sensor F3 is positioned between pump P2 and destination D1
Flow sensor F4 is positioned between junction point J1 and pump P3
Flow sensor F5 is positioned between pump P3 and destination D2
Flow sensor F6 is positioned between junction point J1 and junction point J2
Flow sensor F7 is positioned between junction point J2 and pump P5
Flow sensor F8 is positioned between pump P5 and destination D3
Flow sensor F9 is positioned between junction point J2 and destination D4
Flow sensor F10 is positioned between junction point J1 and junction point J3
Flow sensor F11 is positioned between junction point J3 and destination D5
Flow sensor F12 is positioned between junction point J3 and pump P7
Flow sensor F13 is positioned between pump P7 and destination D6

By comparing fluid data (e.g. flow data, volume data or one or more fluid quality parameters) received from the various sensors located within the fluid distribution network, it can be determined whether the fluid distribution system is subject to fluid losses. In an embodiment, comparisons between fluid data received from at least one first sensor positioned within the fluid distribution system and a second sensor positioned immediately upstream of said at least one first sensor, can be used to determine whether the aggregate fluid flow/fluid volume detected at one or more downstream sensors is equal to the fluid flow/fluid volume detected at the immediately upstream sensor. In an embodiment, responsive to detecting a discrepancy between fluid flow/fluid volume measured at an upstream sensor, and the aggregate fluid flow/fluid volume detected at the sensor(s) positioned downstream (and more preferably immediately downstream) of said upstream sensor, a determination of fluid loss may be made.

In an embodiment of the invention, where a first sensor is positioned immediately upstream of a second sensor, said first and second sensors having no intervening junction points positioned therebetween, a discrepancy in flow or volume data received from the first and second sensors corresponding to a specific time window/time stamp may result in a determination that fluid loss has occurred at a point between said first and second sensors. For example, in the illustration of FIG. 2, detection of a discrepancy in flow or volume data received from flow sensors F2 and F3, may result in detection of fluid loss occurring within the fluid distribution conduit connecting flow sensor F2 and flow sensor F3.

In a further embodiment of the invention, where a first sensor is positioned immediately upstream of a junction point and each downstream branch conduit originating at said junction point has a corresponding sensor positioned downstream of said junction point, a discrepancy between (i) flow data or volume data received from the first sensor and (ii) data representing aggregate flow or volume measured by a set of downstream sensors, each sensor within the set of downstream sensors positioned on a separate downstream branch conduit leading out from the junction point—and wherein said flow or volume data that is under comparison further corresponds to a common time window/time stamp, may result in a determination that fluid loss has occurred at a point between said first sensor and the set of downstream sensors. For example, in the illustration of FIG. 2, detection of a discrepancy between (i) flow or volume data received from sensor F1 and (ii) data representing aggregate flow or volume measured by a set of sensors comprising sensors F2, F4, F6 and F10 (which are positioned on each downstream branch conduit originating at junction point J1, would result in a determination that fluid loss is occurring in at least one of the distribution conduits connecting sensor F1 with sensors F2, F4, F6 and F10.

In specific embodiments of the invention illustrated generally in FIG. 2, sensors F1 to F13 (or any other sensors within fluid distribution system 200) may comprise any one or more of Coriolis flow meters, vortex flow meters and magnetic flow meters. In embodiments where a sensor within fluid distribution system 200 is a Coriolis flow meter, said sensor generates and transmit data representative of mass flow rate of fluid travelling through a fluid distribution conduit/pipe within which said Coreolis flow meter has been positioned for measurement of mass flow rate. Operation of sensors of the Coreolis flow meter type is based on vibrations sensed at a pair of oscillation tubes through which the fluid whose flow is being measured is passed. Fluid flow through the pair of oscillation tubes causes one of the oscillation tubes to twist away from each other, resulting in a detectable phase difference between outputs of a pair of electromagnetic sensors configured to detect vibrations of each of the pair of oscillation tubes. The phase difference is converted to a time difference, and the time difference is directly proportional to mass flow rate, and therefore can be used to determine the mass flow rate.

In embodiments where a sensor within fluid distribution system 200 is a vortex flow meter. Said vortex flow meter based sensors may be configured to measure a frequency of vortices formed by fluid coming off an internal obstruction located within a fluid distribution conduit. The measure frequency of vertex detection is directly proportional to the velocity of fluid, and said sensor measurements applies the calculations to turn signals generated in response to detection of vortices, into a flow rate which can be transmitted by the sensor. In embodiments where a sensor within fluid distribution system 200 is a magnetic flowmeter, the sensor generates a magnetic field and channels it into fluid flowing within a fluid distribution conduit at which said sensor has been implemented. Flow of a conductive fluid through the magnetic field causes a voltage signal to be sensed by electrodes located on walls of the fluid distribution conduit, and the sensed voltage is directly proportional to flow of fluid through the conduit. The sensor may accordingly process a detected voltage signal to determine fluid flow, and transmit the detected fluid flow to an intended recipient of such data.

FIG. 3 illustrates an exemplary data structure 300 that may be used for the purposes of representing a fluid distribution network—which data structure may be used for the purposes of mapping, storing, retrieving and reconciling flow or volume information received from various sensors disposed within a fluid distribution network. The illustration of FIG. 3 maps the fluid distribution network of FIG. 2, and indicates the relative positions of source S, destinations D1 to D6, sensors F1 to F3 and junction points J1 to J3. While the data structure illustrated in FIG. 3 does not illustrate the positions of pumps P1 to P7, it would be understood that the exemplary data structure may be modified to represent the position of the pumps, and any other desired features, components or characteristics of the fluid distribution system—in accordance with techniques that would be immediately apparent to any person of skill in the field of data structures and/or data structure parsing. The exemplary data structure illustrated in FIG. 3 is a graph data structure. It would be understood that any appropriate data structure including trees, directed cyclic graphs, directed acyclic graphs, arrays or linked lists may be used, depending on the structure of the fluid distribution system.

In addition to enabling detection of fluid loss within a fluid distribution system, the invention additionally provides methods and systems for securing the fluid distribution network and its components from tampering and malicious attacks that may be directed at concealing or preventing detection of fluid loss.

The invention secures the fluid distribution system from tampering and malicious attacks through cryptographic security and through implementation of a decentralized network of peer devices that implement a blockchain ledger.

The basis of blockchain technology is the creation of a secure ledger (blockchain ledger) that includes a record of events or transactions that occur on or that are associated with a system. The blockchain ledger forms a database that is stored in a distributed manner across a plurality of peer devices (each acting as a participant database), in a manner that ensures that transactions are verifiable by each peer, and can therefore be verified/validated through a consensus mechanism that ensures transparency and auditability. Additionally, use of the blockchain mechanism ensures that transactions once verified/validated are irrepudiable for the lifetime of the network.

Blockchain technology relies on implementation of one or more smart contracts. In embodiments of the invention, a smart contract comprises executable code that is stored within the blockchain network (for example, on each participant database) and which defines the rules or conditions for verifying/validating transactions and for adding new transactions to the blockchain ledger. The smart contract is stored on each peer device or participant database, and each such device or database executes it and must arrive at the same result for every transaction before such transaction can be added to the blockchain ledger.

FIG. 4 illustrates a decentralized network system 400 configured to implement a blockchain ledger for securing fluid distribution systems in accordance with the teachings of the present invention. Network system 400 comprises a plurality of sensors 402a, 402b, 402c upto 402[n], each sensor communicably coupled with smart contract engine 404, which smart contract engine 404 is in turn communicably coupled with a plurality of network nodes 406a, 406b, 406c upto 406[m]. Each network node 406a to 406[m] is configured to operate as a peer device and may store its own copy of the blockchain ledger. It would be understood that the decentralized network system 400 permits for multiple different configurations including any one or more of the following configurations (i) each network node 406a to 406[m] may comprise a processor and memory located within a corresponding sensor 402a to 402[n] of the fluid distribution system, or (ii) each network node 406a to 406[m] may be implemented on a respective peer processing device that is external to the sensors 402a to 402[n] of the fluid distribution system, or (iii) the smart contract engine 404 may be implemented on a processor that is external to peer devices which are configured to implement one or more network nodes 406a to 406[m], or (iv) each network node may be configured to implement its own copy of the smart contract engine 404, or (v) a plurality of the network nodes 406a to 406[m] (and the blockchain ledgers corresponding to said plurality of network nodes) are implemented through a single processing device and/or a single database or single memory repository.

Network system 400 may be configured such that sensor data (for example fluid flow data or fluid volume data received from each of the sensors 402a to 402[n] is communicated to smart contract engine 404. In particularly secure systems, said sensor data may be cryptographically secured, for example using public-private key cryptography.

Smart contract engine 404 thereafter assesses the received sensor data in accordance with a predefined set of rules or requirements of a predefined smart contract. Subject to received data from a sensor satisfying predefined rules of the smart contract, the transaction is treated as a verified transaction and is consolidated along with one or more other verified transactions within a transaction block. Said transaction block is thereafter added to the blockchain ledger, and appended as the most recent transaction block within the blockchain. In an embodiment of the invention, data received from sensors disposed within the fluid distribution network may be treated and stored as individual transactions within transaction blocks of the blockchain ledger.

FIG. 5 illustrates an exemplary blockchain ledger 500 comprising transaction blocks [1] to [n]. Each transaction block is linked to the immediately preceding block in the ledger, for example by ensuring that the header of each transaction block includes information regarding the identity or location of the immediately preceding block in the blockchain—thereby enabling the blockchain ledger to be parsed from the most recently appended transaction block, through each intermediate transaction block and upto the first block in the chain (i.e. upto the root block or the genesis block).

FIG. 6 illustrates an exemplary data structure 600 (block [i]) that may be used to store contents of a transaction block in accordance with a blockchain implementation of the present invention. In the data structure of FIG. 6, a transaction block 600 may include (i) one or more sets of sensor data received from sensors disposed within the fluid distribution system, (ii) a unique sensor ID corresponding to each instance of received sensor data, (iii) a time stamp associated with each instance of received sensor data, (iv) a device firmware hash value corresponding to each instance of received sensor data—said device firmware hash value comprising the output of a predefined hash function applied to part or whole of device firmware implemented within the sensor responsible for generating the instance of received sensor data, and/or (v) a unique hash value corresponding to the immediately preceding transaction block within the blockchain ledger. Data structures implementing some or all of the contents of the exemplary data structure of FIG. 6 may be used for the purposes of implementing a blockchain ledger based embodiment of the present invention.

FIG. 7 illustrates a method embodiment of the present invention, implemented based on a fluid distribution system of the type illustrated and discussed in connection with FIG. 2.

Step 702 comprises receiving from each of a plurality of sensors (that are located within a fluid distribution system), data representing one or more of (i) a quantity of fluid transmitted through a fluid conduit at which said sensor is located, (ii) a time stamp representing a time period corresponding to the sensor reading(s), (iii) a unique device ID corresponding to said sensor, and (iv) a device firmware hash value generated by applying a predefined hash function to part or whole of device firmware implemented within said sensor.

At step 704, subject to verification of validity of data received from one or more sensors, the method aggregates data received from said one or more sensors into a block of transactions—wherein each transaction within the block represents a set of data received from one of the plurality of sensors. In a more preferred embodiment, each transaction within the block represents a set of data that is received from one of the plurality of sensors, and which set of data is associated with a specific timestamp or time window.

It would be understood that the step of establishing validity of data received from each sensor may comprise verification according to one or more predefined rules. In a specific embodiment, verification of received data may include one or more of (i) validating the identity of the sensor based on public-private key cryptography and/or digital signatures and (ii) comparing a first device firmware hash value received from a sensor as part of the set of data under verification, with a second device firmware hash value received from the same sensor as part of a set of data that has been previously verified and added to the blockchain ledger.

In a more specific embodiment, verifying received data may comprise comparing a first device firmware hash value received from a sensor as part of the set of data under verification, and a second device firmware hash value received from the same sensor as part of the most recent set of data that has been received from said sensor and that has been verified and added to the blockchain ledger. It would be understood that responsive to the comparison between the first device firmware hash value and second device firmware hash value resulting in a match, the validity of the data under verification may be considered verified, and the data may be added as a transaction within a transaction block in the blockchain ledger. Conversely, responsive to the comparison between the first and second device firmware hash values resulting in a non-match, the data under verification may be treated as invalid, and would not be added to the blockchain ledger.

Step 706 comprises submitting the block of transactions aggregated at step 704 for inclusion in a blockchain ledger—which blockchain ledger includes a plurality of transaction blocks representing data previously received from one or more sensors within the fluid distribution system. Step 708 thereafter comprises appending the transaction block submitted at step 706, to the blockchain ledger. In an embodiment of the invention, appending the transaction block may be subject to the submitted transaction block meeting one or more predetermined rules regarding addition of new blocks to the blockchain ledger. In an embodiment, said predetermined rules may include a requirement for verification through hash value comparison (discussed above in connection with step 704) to be implemented through a consensus based mechanism by a majority of (and more preferably by all) peer devices that are maintaining the blockchain ledger corresponding to the fluid distribution system.

It would be understood that by (i) including a device firmware hash value in each set of data received from a sensor, and (ii) requiring each device firmware hash value that is received from a sensor to be compared against a device firmware hash value received previously from the same sensor, the invention ensures that a device has not been tampered with, or in any way altered—since tampering or altering the device firmware would result in a change in the device firmware hash value.

As discussed above, the invention relies on comparison of fluid data (e.g. flow data, volume data or one or more fluid quality parameters) received from multiple sensors located within a fluid distribution system, for the purposes of (i) determining whether the fluid distribution system is subject to fluid losses and (ii) locating where fluid loss is occurring within the fluid distribution system. Yet further, the invention relies on comparisons between fluid data received from at least one first sensor positioned within the fluid distribution system and a second sensor positioned immediately upstream of said at least one first sensor to determine whether the aggregate fluid flow/fluid volume detected at one or more downstream sensors is equal to the fluid flow/fluid volume detected at the immediately upstream sensor.

In embodiments where the invention relies on implementation of a blockchain ledger based system (of the type discussed in connection with FIGS. 4 to 7), it would be understood that fluid data representing flow rate or volume or one or more fluid quality parameters measured by the first and second sensors discussed above may be retrieved from the blockchain ledger prior to comparison. In a more preferred embodiment, retrieving fluid data corresponding to a first sensor and a second sensor from the blockchain ledger may include the step of retrieving fluid data generated by said first sensor and said second sensor based on the time stamp associated with generation of said fluid data—for example, retrieving fluid data corresponding to a first sensor and a second sensor, subject to the fluid data from both sensors having an identical time stamp, or subject to the fluid data from both sensors having been generated within a predefined time window.

FIG. 8 illustrates an exemplary method in accordance with the present invention, wherein detection of fluid loss is based on analysis of fluid data collected from sensors disposed respectively upstream and downstream of junction points throughout the fluid distribution network.

Step 802 comprises the method step of comparing, for each junction point in the fluid distribution system, (i) flow rate/volume data/fluid quality parameter data received from an inlet sensor located at or upstream of an inlet to the junction point—which flow rate/volume data/fluid quality parameter data represents fluid flow through said junction point inlet, with (ii) flow rate/volume data/fluid quality parameter data received from a plurality of outlet sensors that are each located at or downstream of respective outlets to the junction point (i.e. located within branch conduits originating at the junction point)—which flow rate/volume data/fluid quality parameter data at each sensor represents the respective fluid flow through the corresponding junction point outlet.

Taking the example of the fluid distribution system illustrated in FIG. 2, it would be noted that said system has junction points J1 to J3. Implementing step 802 on said fluid distribution system would involve:

- For junction point J1—comparing flow rate/volume data/fluid quality parameter data received from sensor F1 against an aggregate of flow rate/volume data/fluid quality parameter data received from each of sensors F2, F4, F6 and F 10
- For junction point J2—comparing flow rate/volume data/fluid quality parameter data received from sensor F6 against an aggregate of flow rate/volume data/fluid quality parameter data received from each of sensors F7 and F9
- For junction point J3—comparing flow rate/volume data/fluid quality parameter data received from sensor F10 against an aggregate of flow rate/volume data/fluid quality parameter data received from each of sensors F11 and F12

In an embodiment of the invention, the data representing flow rate or volume or fluid quality parameter data measured by the inlet and outlet sensor(s) discussed above may be retrieved from a blockchain ledger implemented in connection with the fluid distribution system. In a more preferred embodiment, retrieving fluid data corresponding to the inlet and outlet sensor(s) from the blockchain ledger may include the step of retrieving fluid data generated by said inlet and outlet sensors based on the time stamp associated with generation of said fluid data—for example, retrieving fluid data corresponding to an inlet sensor and one or more outlet sensors, subject to the fluid data from all such sensors having an identical time stamp, or subject to the fluid data from all such sensors having been generated within a predefined time window.

In an embodiment of the invention, the identification of junction points within the fluid distribution system and of inlet and outlet sensors associated with each junction point is made possible by parsing a data structure (for example, a data structure of the type represented in FIG. 3) that represents the structure of the fluid distribution system and the location of junction points and various sensors and components associated with said system.

Step 804 comprises detection or identification of discrepancy between the flow data or volume data or the fluid quality parameter data received from the inlet sensor positioned at the junction point inlet and the aggregate of flow data or volume data received from the plurality of outlet sensors positioned at each of the junction point outlets. It would be understood that detected discrepancies would indicate fluid loss or fluid theft or fluid adulteration or fluid substitution at the junction point or between the junction point inlet and one of the junction point outlets. In an embodiment of the invention, identifying discrepancies may include comparison of one or more of data derived from phase shift data received from electromagnetic sensors configured to measure vibrations of oscillation tubes, data derived from sensors configured to measure frequency of vortex generation within a fluid distribution conduit, and data derived from sensor configured to measure a voltage generated by a conductive fluid passing through a magnetic field applied across a fluid distribution conduit.

Step 806 comprises an optional step of identifying any discrepancies between flow data/volume data/fluid quality parameter data received from any pair(s) of sensors that are positioned in an upstream—downstream arrangement relative to each other along any fluid distribution conduit(s) within the fluid distribution system. It would be understood that detected discrepancies would indicate fluid loss or fluid theft or fluid adulteration or fluid substitution at a point located between the pair of sensors under consideration.

Step 808, thereafter comprises raising alerts based on one or more detected discrepancies. Said alert may indicate detection of a fluid loss event or a fluid theft event or a fluid adulteration event or a fluid substitution event, and/or the specific location of the detected fluid loss event, or the specific location of the sensors in whose vicinity the fluid loss event has been detected, or the quantity of the detected loss.

In a specific embodiment of the invention, detecting discrepancies may involve parsing data from every pair of sensors that are in an immediate upstream-downstream relationship to each other, and detecting system-wide discrepancies based on such data. In certain embodiments, where a fluid distribution system distributes fluid across multiple sectors, the discrepancy detection steps may be implemented on a per-sector basis, or may involve detection and consolidation or reconciliation of discrepancies across sectors as well. In one embodiment, the system may respond to detection of a discrepancy at steps 804 and/or 806 by ascertaining the firmware associated with any of the sensors at which a discrepancy has been detected, has been tampered with. Responsive to ascertaining that said firmware has been tampered with, the method may comprise generating alerts corresponding to one or more of a fluid loss event, a fluid theft event, a fluid adulteration event or a fluid substitution event. Responsive to ascertaining that said firmware has not been tampered with, the method may comprise generating a "pipe burst" or "leakage" alert. FIG. 9 illustrates a system embodiment 900 of the present invention. Said system 900 comprises a fluid distribution sensor having a plurality of sensors 902*a* to 902*c* configured to operate in accordance with the discussions above. It would be understood that in embodiments of the invention, fluid distribution system 902 and sensors 902*a* to 902*c* may be configured in accordance any of the one or more embodiments discussed hereinabove, particularly in connection with FIGS. 1 to 3.

Sensors 904*a* to 904*c* are in network communication with blockchain layer 904—which blockchain layer includes peer nodes 904*a* to 904*c*. Each of peer nodes 904*a* to 904*c* may be configured to execute smart contract 9042, which smart contract 9042 is included in blockchain layer 904, and may be individually be stored within each peer node, or within a centralized repository that is accessible by a plurality of peer nodes. Blockchain layer 904, smart contract 9042 and peer nodes 904*a* to 904*c* may be configured to operate in accordance with any one or more embodiments discussed hereinabove, including in connection with FIGS. 4 to 6.

The blockchain layer 904 is communicably coupled with a processor implemented data comparator, which data comparator is configured to compare data received from multiple sensors within fluid distribution system 902, and to detect fluid loss events based on said data comparisons. In various embodiments, data comparator 906 may be configured to implement one or more of the method steps discussed above in connection with FIGS. 7 and 8.

Data comparator 906 is communicably coupled with anomaly response controller 908—which anomaly response controller may be configured to trigger or implement one or more predefined responses to detection of an anomaly such as an unauthorized fluid loss event within fluid distribution system 902—which responses may include without limitation, generation or communication of a notification, flag or alert regarding detection of fluid loss within the fluid distribution system.

FIG. 10 illustrates an exemplary system for implementing the present invention.

The computing system 1002 comprises one or more processors 1004 and at least one memory 1006. Processor 1004 is configured to execute program instructions—and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various software executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions that is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The present invention offers an efficient and secure mechanism for detecting fluid loss and verifying the location of fluid loss. The invention additionally ensures that the fluid distribution network is secure and tamper proof, thereby precluding unauthorized persons from altering quantification values received at or received from sensors implemented within the fluid distribution network with a view to conceal losses.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

The invention claimed is:

1. A system for detecting fluid loss in a fluid distribution network that includes a fluid source, one or more fluid destinations and a network of fluid distribution conduits configured to enable fluid communication between the fluid source and the one or more fluid destinations, the system comprising:
   a plurality of sensors disposed within the fluid distribution network, wherein:

each of the plurality of sensors is configured to quantify fluid flow; and each of the plurality of sensors is in network communication with a processor implemented smart contract engine;

at least one processor implemented smart contract engine, configured to:

validate data received from one or more of the plurality of sensors, wherein said validation is based on a set of predefined rules;

responsive to validation of data received from a sensor, record the validated data within a transaction block comprising validated data received from one or more other sensors from among the plurality of sensors; and append the transaction block to a blockchain ledger;

a plurality of processor implemented peer nodes, each configured to store and update a copy of the blockchain ledger; and a data comparator configured to:

retrieve from the blockchain ledger, a first set of fluid flow data generated by a first sensor and a second set of fluid flow data generated by a second sensor, wherein each of the first sensor and the second sensor is selected from among the plurality of sensors, and wherein the selected first sensor is located upstream of the selected second sensor within the fluid distribution network; and identify occurrence of fluid loss within a fluid conduit connecting the first sensor and the second sensor, based on results of a data comparison involving at least the first set of fluid flow data retrieved from the blockchain ledger and the second set of fluid flow data retrieved from the blockchain ledger, wherein the at least one processor implemented smart contract engine is configured to validate fluid flow data received from a sensor responsive to determining that a device firmware hash value received from the sensor along with the fluid flow data under validation matches a device firmware hash value that has been previously received from the sensor, wherein the device firmware hash value that has been previously received from the sensor is generated by applying a hash function to device firmware implemented within the sensor, wherein the at least one processor implemented smart contract engine is configured to invalidate the fluid flow data received from the sensor responsive to determining that the device firmware hash value received from the sensor along with the fluid flow data under validation does not match the device firmware hash value that has been previously received from the sensor, wherein the at least one processor implemented smart contract engine is configured to determine that the sensor has been tampered with when the fluid flow data is invalidated, wherein the selected first sensor is located at or upstream of a fluid inlet of a junction point within the fluid distribution network, and wherein the selected second sensor is located within a branch conduit originating from the junction point.

2. The system as claimed in claim 1, wherein the data comparator is configured such that identification of occurrence of fluid loss is based on receiving and comparing the first set of fluid flow data against an aggregation of fluid flow data received from sensors located within each branch conduit originating from the junction point.

3. The system as claimed in claim 1, wherein the data comparator is configured to detect fluid loss within the fluid distribution network based on analysis of fluid flow data received from sensors positioned at or upstream of each junction point inlet within the fluid distribution network and fluid flow data received from sensors located within each branch conduit originating from each junction point within the fluid distribution network.

4. The system as claimed in claim 1, wherein generation of the first set of fluid flow data and the second set of fluid flow data, respectively, by said first sensor and said second sensor, occurs within a predefined time window.

5. The system as claimed in claim 1, further comprising an anomaly response controller configured to implement one or more predefined actions in response to detection of fluid loss within the fluid distribution network.

6. The system as claimed in claim 1, wherein the device firmware hash value that has been previously received from the sensor is generated by applying, at a first point in time, the hash function to the device firmware implemented within the sensor, and wherein the device firmware hash value received from the sensor along with the fluid flow data under validation is generated by applying, at a second point in time after the first point in time, the hash function to the device firmware implemented within the sensor.

7. A method for detecting fluid loss in a fluid distribution network that includes a fluid source, one or more fluid destinations and a network of fluid distribution conduits configured to enable fluid communication between the fluid source and the one or more fluid destinations, the method comprising:

retrieve from a blockchain ledger, a first set of fluid flow data generated by a first sensor and a second set of fluid flow data generated by a second sensor, wherein each of the first sensor and the second sensor is selected from among a plurality of sensors disposed within the fluid distribution network, and wherein the selected first sensor is located upstream of the selected second sensor within the fluid distribution network;

identify occurrence of fluid loss within a fluid conduit connecting the first sensor and the second sensor, based on results of a data comparison involving at least the first set of fluid flow data retrieved from the blockchain ledger and the second set of fluid flow data retrieved from the blockchain ledger;

wherein the blockchain ledger comprises a distributed ledger database generated based on steps comprising:

receiving from each of the plurality of sensors disposed within the fluid distribution network, data quantifying fluid flow through a fluid distribution conduit in which said each sensor is located;

validating data received from one or more of the plurality of sensors, wherein said validation is based on a set of predefined rules;

responsive to validation of received sensor data, recording the validated data within a transaction block comprising validated data received from one or more other sensors from among the plurality of sensors; and appending the transaction block to the blockchain ledger, wherein fluid flow data received from a sensor is validated in response to a determination that a device firmware hash value received from the sensor along with the fluid flow data under validation matches a device firmware hash value that has been previously received from the sensor, wherein the device firmware hash value that has been previously received from the sensor is generated by applying, at a first point in time, a hash function to device firmware implemented within the sensor, wherein the device firmware hash value received from the sensor along with the fluid flow data under validation is generated by applying, at a second point in time after the first point in time, the hash function to the device firmware implemented within the sensor, and wherein the fluid flow data received from the sensor is invalidated responsive to determining that the device firmware hash value received from the sensor along with the fluid flow data under verification does not match the device firmware hash value that has been previously received from the sensor.

8. The method as claimed in claim 7, wherein:

the selected first sensor is located at or upstream of a fluid inlet of a junction point within the fluid distribution network; and the selected second sensor is located within a branch conduit originating from the junction point.

9. The method as claimed in claim 8, wherein identification of an occurrence of fluid loss is based on receiving and comparing the first set of fluid flow data against an aggregation of fluid flow data received from sensors located within each branch conduit originating from the junction point.

10. The method as claimed in claim 8, wherein detecting fluid loss within the fluid distribution network includes analysis of fluid flow data received from sensors positioned at or upstream of each junction point inlet within the fluid distribution network and fluid flow data received from sensors located within each branch conduit originating from each junction point within the fluid distribution network.

11. The method as claimed in claim 7, wherein generation of the first set of fluid flow data and the second set of fluid flow data respectively by said first sensor and said second sensor, occurs within a predefined time window.

12. The method as claimed in claim 7, further comprising implementing one or more predefined actions in response to detection of fluid loss within the fluid distribution network.

13. A computer program product for detecting fluid loss in a fluid distribution network that includes a fluid source, one or more fluid destinations and a network of fluid distribution conduits configured to enable fluid communication between the fluid source and the one or more fluid destinations, the computer program product comprising a non-transitory computer readable medium having computer readable program code embodied thereon, the computer readable program code comprising instructions for:

retrieving from a blockchain ledger, a first set of fluid flow data generated by a first sensor and a second set of fluid flow data generated by a second sensor, wherein each of the first sensor and the second sensor is selected from among a plurality of sensors disposed within the fluid distribution network, and wherein the selected first sensor is located upstream of the selected second sensor within the fluid distribution network;

identifying occurrence of fluid loss within a fluid conduit connecting the first sensor and the second sensor, based on results of a data comparison involving at least the first set of fluid flow data retrieved from the blockchain ledger and the second set of fluid flow data retrieved from the blockchain ledger;

wherein the blockchain ledger comprises a distributed ledger database generated based on steps comprising:

receiving from each of the plurality of sensors disposed within the fluid distribution network, data quantifying fluid flow through a fluid distribution conduit in which said each sensor is located;

validating data received from one or more of the plurality of sensors, wherein said validation is based on a set of predefined rules;

responsive to validation of received sensor data, recording the validated data within a transaction block comprising validated data received from one or more other sensors from among the plurality of sensors; and appending the transaction block to the blockchain ledger, wherein fluid flow data received from a sensor is validated in response to a determination that a device firmware hash value received from the sensor along with the fluid flow data under validation matches a device firmware hash value that has been previously received from the sensor, and wherein the fluid flow data received from the sensor is invalidated responsive to determining that the device firmware hash value received from the sensor along with the fluid flow data under verification does not match the device firmware hash value that has been previously received from the sensor, wherein the selected first sensor is located at or upstream of a fluid inlet of a junction point within the fluid distribution network, wherein a plurality of branch conduits originate at the junction point with each branch conduit including another sensor immediately downstream of the selected first sensor, and wherein fluid loss is identified when there is a discrepancy between the first set of fluid flow data and an aggregation of fluid flow data received from the another sensors immediately downstream of the selected first sensor in the branch conduits.

14. The computer program product as claimed in claim 13, wherein the device firmware hash value that has been previously received from the sensor is generated by applying a hash function to device firmware implemented within the sensor.

15. The computer program product as claimed in claim 14, wherein the device firmware hash value that has been previously received from the sensor is generated by applying, at a first point in time, the hash function to the device firmware implemented within the sensor, and wherein the device firmware hash value received from the sensor along with the fluid flow data under validation is generated by applying, at a second point in time after the first point in time, the hash function to the device firmware implemented within the sensor.

* * * * *